United States Patent [19]

Thomas

[11] B 4,002,367
[45] Jan. 11, 1977

[54] INSULATION FOR A VEHICLE ROOF

[75] Inventor: William R. Thomas, Granville, Ohio

[73] Assignee: Owens-Corning Fiberglas Corporation, Toledo, Ohio

[22] Filed: Mar. 18, 1974

[21] Appl. No.: 452,034

[44] Published under the second Trial Voluntary Protest Program on March 23, 1976 as document No. B 452,034.

Related U.S. Application Data

[62] Division of Ser. No. 228,782, Feb. 14, 1972.

[52] U.S. Cl. .......................... 296/137 A; 296/31 R; 296/39 A
[51] Int. Cl.² ............................................. B60J 7/00
[58] Field of Search ........... 296/137 A, 39 A, 31 R; 181/33 GA

[56] References Cited

UNITED STATES PATENTS

| | | | |
|---|---|---|---|
| 1,926,737 | 9/1933 | Blum | 296/31 R X |
| 2,110,492 | 3/1938 | Upson | 296/39 A X |
| 2,428,591 | 11/1947 | Slayter | 296/137 A X |
| 2,879,105 | 3/1959 | Stahl | 296/137 A |
| 3,097,015 | 7/1963 | Nagel | 296/137 A |
| 3,265,530 | 8/1966 | Marzocchi | 296/137 A X |
| 3,620,906 | 11/1971 | Hannes | 296/137 A X |

Primary Examiner—Robert J. Spar
Assistant Examiner—Donald W. Underwood
Attorney, Agent, or Firm—John W. Overman; Allen D. Gutchess, Jr.

[57] ABSTRACT

Improved roof insulation for vehicles is provided. The insulation includes a layer of glass fibers held by a binder, which layer is flexible and compressible. A non-woven sheet is adhered to the lower surface of the fibrous layer and thereby improves the handleability of the layer and retains particulate material and especially fibers in the layer when being installed in a vehicle. The non-woven sheet also adds a degree of stiffness to the fibrous layer to prevent excessive drape thereof when being installed overhead, and yet the flexibility of the layer is retained. The non-woven sheet also protects the fibrous layer from tearing during installation and preferably can be dyed, which is particularly important when perforate headliners are employed therebelow. A non-woven porous sheet also can be employed on the upper surface of the fibrous layer which further improves the handleability and dimensional stability thereof, and protects the fibrous layer from damage. The upper porous sheet enables adhesive used to affix the layer to the lower or inner surface of the vehicle roof to penetrate the sheet and extend into the fibers. The upper sheet also serves as a net-like reinforcement for the adhesive.

5 Claims, 5 Drawing Figures

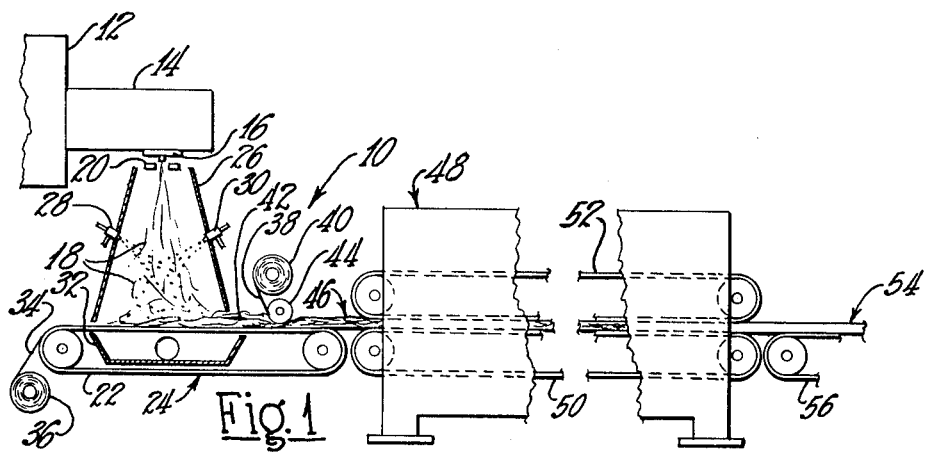
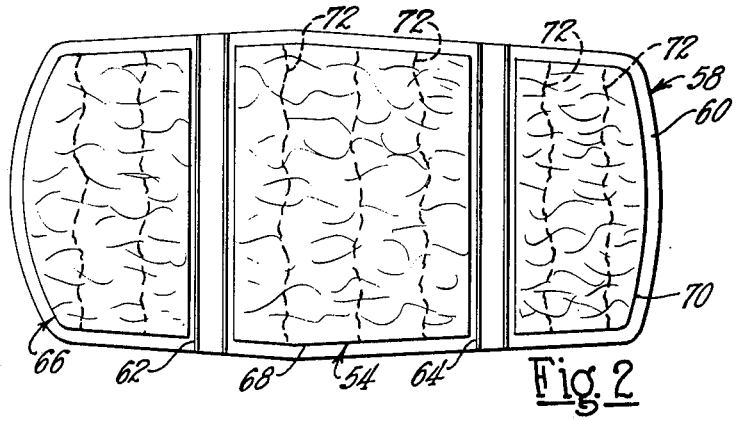
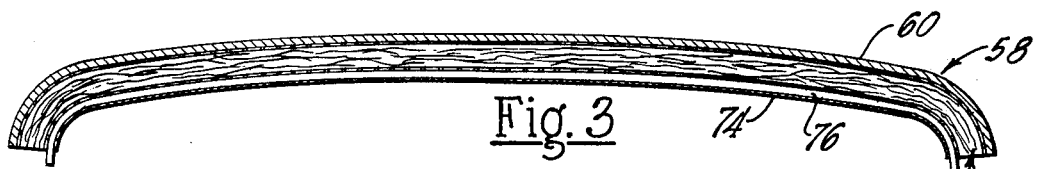
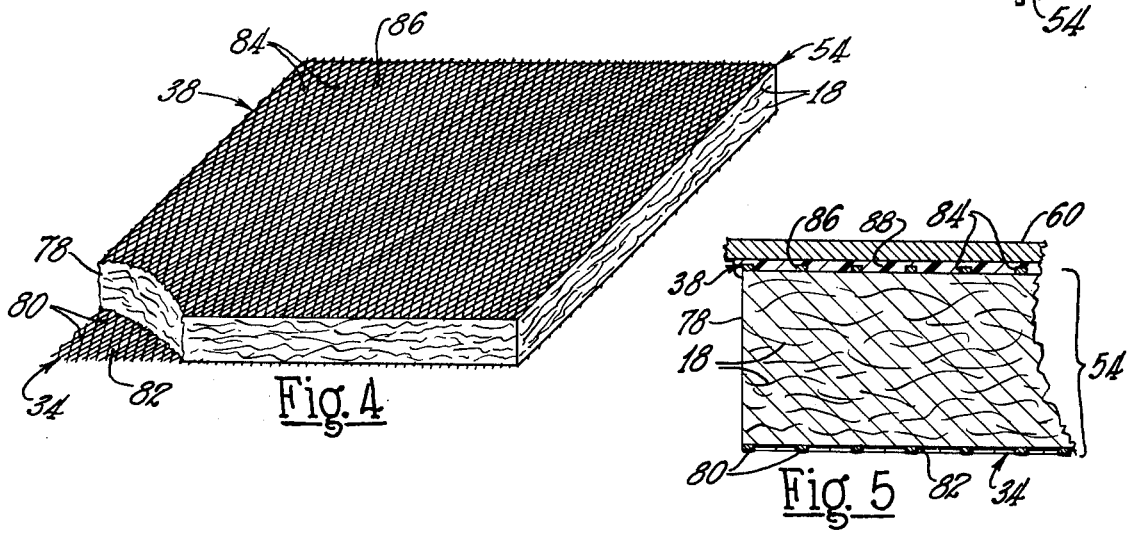

INSULATION FOR A VEHICLE ROOF

This is a division of application Ser. No. 228,782 filed Feb. 14, 1972.

This invention relates to a fibrous body with a non-woven sheet on at least one major surface thereof to improve handleability, and more particularly to roof insulation for a vehicle comprising a glass fiber layer with non-woven fabric on at least one surface thereof.

The installation of roof insulation in a vehicle and particularly in an automobile, is difficult since it must be undertaken in a somewhat cramped space and applied overhead. Particulate material will occasionally drop from the fibrous layer of the insulation into the installer's eyes, and fibers may cause irritation to the skin, particularly when the insulation is handled repetitively on a job. The insulation must be flexible to conform to the roof of the vehicle and consequently may drape or droop excessively, hindering installation. Further, the insulation may tear or otherwise be damaged when being installed.

In accordance with the invention, a flexible sheet of a non-woven material is adhered to the lower surface of the fibrous layer of the roof insulation. This sheet retains fibers and particulate material in the layer to prevent such material falling on the installer. The sheet is soft and acts as a protective layer between the fibrous layer and the installer to prevent irritation. The non-woven sheet adds a certain amount of overall stiffness to the insulation to reduce any tendency to sag or drape when being installed, yet enables adequate flexibility to be retained in the insulation to conform to the vehicle roof. The sheet also provides greater dimensional stability for the fibrous layer to aid in the proper positioning thereof relative to the roof, and protects against tearing or damage thereto. At the same time, the sheet enables pressure to be applied by the installer to the fibrous layer more uniformly and more comfortably when the layer is being pressed into contact with adhesive on the lower surface of the vehicle roof. The non-woven sheet also will not crinkle or otherwise make a noise when depressed so that, similarly, no noise will result if an occupant presses against the headliner of the vehicle. The non-woven, cloth-like sheet is preferably made of synthetic fibers which can be dyed a dark color. This is particularly important where the insulation will be used with a perforated headliner, as is often done in trucks, to prevent the insulation from being visible through the perforations in the headliner. The sheet also preferably is porous so as not to have a deleterious effect on acoustical properties of the insulation, and is flame retardant.

A porous, non-woven sheet can also be applied on the opposite or upper surface of the fibrous layer. Such a sheet further improves handleability of the insulation and dimensional stability thereof, and provides additional protection against tearing or other damage. The second sheet also increases the stiffness of the insulation yet still enables it to conform to the vehicle roof. With the second sheet on the insulation, when it is pressed into contact with the adhesive, the adhesive can be directed through the pores or openings in the second sheet and into contact with the fibers of the fibrous layer. The second sheet thereby inhibits the adhesive from possibly spreading too thinly. Further, the second sheet provides a net-like reinforcement in the adhesive to increase the adhesion between the roof and the insulation.

It is, therefore, a principal object of the invention to provide a layer or body of fibrous material with a non-woven sheet on a major surface thereof to improve the handleability of the layer or body.

Another object of the invention is to provide roof insulation for a vehicle, which insulation has a non-woven sheet adhered to at least one surface thereof to improve handleability and other characteristics which enable the insulation to be installed more easily and more rapidly.

Still another object of the invention is to provide roof insulation for a vehicle, which insulation has non-woven sheets on both major surfaces of fibrous material with at least the top sheet being porous to receive an adhesive by means of which the insulation is affixed to the lower surface of the roof of the vehicle.

Yet a further object of the invention is to provide roof insulation which provides a stronger bond with the roof of a vehicle.

Other objects and advantages of the invention will be apparent from the following detailed description of a preferred embodiment thereof, reference being made to the accompanying drawings, in which:

FIG. 1 is a schematic, fragmentary side view in elevation of a fiber-forming line which can be used to produce roof insulation according to the invention;

FIG. 2 is a schematic bottom view of a vehicle roof with insulation embodying the invention installed therewith;

FIG. 3 is an enlarged view in transverse cross section taken through the roof and insulation of FIG. 2;

FIG. 4 is an enlarged view in perspective of the roof insulation, with a part broken away; and FIG. 5 is an enlarged, fragmentary, cross-sectional view taken through the roof insulation, roof panel, and adhesive.

Referring to the drawings and particularly to FIG. 1, a rotary fiber-forming production line indicated at 10 can be used to produce vehicle roof insulation according to the invention, with substantially no additional labor being required over and above that employed to make conventional roof insulation as heretofore known. Glass is melted in a tank 12 and supplied through a forehearth 14 to a rotary fiber-forming unit 16. Fibers indicated at 18 are blown downwardly from the unit 16 by a blower 20 and deposited on a belt 22 of a conveyor 24. The fibers are projected downwardly in a forming hood 26, with binder applied by spray applicators or guns 28 and 30, and are deposited onto the belt with the aid of a vacuum chamber 32 located immediately below the upper run of the belt 22. This basic apparatus is known in the art and will not be discussed in further detail.

In this instance, a web or sheet 34 of a non-woven fabric is supplied onto the upper run of the conveyor belt 22 from a supply spool 36 located upstream of the forming hood 26. The web 34 preferably is porous and does not inhibit the function of the vacuum chamber 32 in aiding to collect the fibers on the belt 22. The fibers 18 with the binder applied thereto are deposited directly on the web 34 on the upper run of the belt 22 and are carried toward the right, as shown in FIG. 1. The web is thereby adhered directly to the fibers through the binder with the fibers also being adhered to one another by the binder.

If desired, a second web or sheet 38 can be applied from a second supply spool 40 to the upper surface of a resulting glass fiber layer 42. The web 38 is directed around and pressed into contact with the layer 42 of fibers by a guide roll 44, resulting in an uncured sandwich 46 of the fiber layer and two webs or sheets if both are used. This is then conveyed through a suitable oven 48 including a heated chamber through which extend two conveyors 50 and 52 spaced apart a predetermined distance to place the sandwich 46 under compression while the binder is being cured. The binder thereby holds the fibers together and also adheres the webs 34 and 38 to the fibrous layer. Cured roof insulation 54 is produced, having two smooth major surfaces on which are the webs 34 and 38. The insulation 54 is carried away by an exit conveyor 56 to a point where it can be cut to predetermined final shape. Alternately, the insulation can be rolled into reels and transported in that manner to or closer to a point of final use where it can be cut or formed to the desired shape.

The roof insulation 54 preferably is cut into sections before being applied to a vehicle roof, a roof 58 being shown from below in FIG. 2. The roof includes a main panel 60 of a suitable contour, as shown in FIG. 3, and cross struts 62 and 64 extending thereacross and spot welded to the lower surface thereof. In this instance, three roof insulation sections 66, 68, and 70 are adhered to the lower surface of the roof 58 adjacent the longitudinally-extending edges of the struts 62 and 64. Each of the roof insulation sections has a shape, at least in part, corresponding to a part of the shape of the roof, these being pre-formed so that no subsequent trimming is required. The roof insulation is affixed to the lower surface of the panel 60 by lines or stripes 72 of adhesive which are preferably applied to the lower surface of the panel 60 by a suitable dispenser, after which the roof insulation sections 66–70 are pressed into place by an installer. The installer must work in a cramped space and is usually directly below the roof insulation as he installs it. By dividing the roof insulation into sections, it is easier to install than when in fewer, larger pieces, but even so installation is not easy. If only one strut is employed for the roof 58, the roof insulation is preferably made in four sections, two on each side of the strut, even though two sections would be sufficient to accommodate the single strut.

After the roof insulation is in place, a headliner 74 (FIG. 3) is installed adjacent the insulation 54. This is accomplished through listing wires 76 which are sewn into or otherwise suitably affixed to the headliner and snapped into place in side moldings (not shown) of the roof, as is known in the art.

The roof insulation 54 is shown more fully in FIG. 4. A central layer or body 78 of glass fibers held together by a suitable binder is light in weight, having an apparent density of 1 to 4 pcf and preferably about 1½ pcf. The fibers 18 in the layer 78 have diameters in the order of 0.00015–0.00035 inch and the binder is present in an amount of 5 to 25 percent by weight. With this constitution, the layer 78 is both compressible and flexible to enable it to be conformed to the contour of the roof 58.

The web or sheet 34 includes strand-like groups 80 of fibers arranged in a net-like pattern, with openings or interstices 82 therebetween. The sheet 34 is non-woven, however, and the fiber groups 80 do not intertwine. The fibers in the sheet can be of a synthetic nature, such as rayon, and preferably can be dyed so that a dark color can be imparted to the lower surface of the insulation 54 when it is used with a perforated headliner. This prevents the insulation from being visible through the perforations. The sheet 34 is also soft to the touch so that the installer can place pressure thereagainst to affix the insulation 54 to the roof 58 comfortably and without irritation, as can otherwise occur if contact is made directly, and particularly under pressure, with the fibrous layer 78. The sheet 34 also retains particulate material, especially fibers, in the layer 78 and prevents them falling onto the installer during the installation. Further, the sheet 34 is flexible so as not to inhibit the flexibility of the overall insulation 54 in conforming to the roof contour. However, the sheet 34 does tend to increase the stiffness of the insulation to reduce the tendency of it to sag or drape during installation, which renders installation somewhat more difficult. The sheet 34 also prevents tearing of or other damage to the insulation during installation and further adds dimensional stability to the insulation to enable the installer to position and conform it more readily to the desired area of the roof. The sheet will not crinkle so that an occupant of the vehicle pressing upwardly on the headliner 74 will not hear any paper-like noise as the insulation is compressed or deformed. Additionally, the sheet 34 is flame retardant for added safety. The openings 82 in the sheet 34 also assure that sound-absorbing capabilities achieved by the body or layer 78 will not be impaired.

The upper sheet or web 38, as shown, is constructed similarly to the lower sheet 34, having groups 84 of fibers and having openings or interstices 86 therebetween. When the upper sheet 38 is used, it provides further improvement in the handleability of the insulation and the dimensional stability thereof; the second sheet also tends to increase stiffness to facilitate installation, and yet the insulation can still readily conform to the roof contour. The second sheet provides additional protection against tearing or other damage to the insulation and specifically to the layer 78. This sheet 38 has an additional advantage in providing increased adhesion between the insulation 54 and the lower surface 60 of the vehicle roof. As shown in FIG. 5, the upper sheet 38 provides a net-like reinforcement in adhesive 88 of the stripe 72 (FIG. 2) to increase the strength of the adhesive layers. The sheet 38 also aids in directing the adhesive 88 through the openings 84 and into contact with fibers in the upper portion of the layer 78. Thus, the sheet 38 directs the adhesive downwardly into contact with the fibers to prevent the adhesive spreading too thinly when the insulation is pressed into place thereagainst.

The non-woven fabric sheets 34 and 38 can be applied to other fibrous layers or bodies which are subject to causing irritation or discomfort to an installer who is required to handle the fibrous body and install it in a particular location for a particular application. The non-woven fabric sheets in such instances again will add dimensional stability to the fibrous body, reduce damage thereto, and provide retention against falling fibers or particulate matter especially when the fibrous body is being installed overhead.

Various modifications of the above-described embodiments of the invention will be apparent to those skilled in the art, and it is to be understood that such modifications can be made without departing from the scope of the invention, if they are within the spirit and the tenor of the accompanying claims.

I claim:

1. In combination, a vehicle roof panel, adhesive extending over a substantial portion of a lower surface of said roof panel, a compressible, flexible layer of glass fibers held together by a binder, said layer being of substantially uniform thickness and having a shape at least in part corresponding to at least part of the shape of said roof panel, an upper, non-woven, porous fabric adhered to the upper surface of said layer, with a portion of said adhesive extending through interstices in said porous fabric and into contact with fibers of said layer to adhere said layer to the lower surface of said panel with said porous fabric serving as a net-like reinforcement in the adhesive, a lower, cloth-like, non-woven fabric adhered to the lower surface of said layer by the same binder which holds the glass fibers together, said lower, non-woven fabric extending substantially over the entire surface of said layer and also having a shape at least in part corresponding to at least part of the shape of said roof panel, and a headliner separate from said lower, non-woven fabric and located therebelow and covering substantially all of said lower, non-woven fabric.

2. The combination according to claim 1 characterized by said fabric being made of synthetic fibers and being soft to the touch, flame retardant, and porous.

3. The combination according to claim 1 characterized by said upper porous fabric being in the form of a non-woven net and aiding in reinforcing the adhesion between said layer and said roof panel.

4. The combination according to claim 1 charaterized by said lower fabric being composed of synthetic fibers dyed a dark color and said headliner having openings therein.

5. The combination according to claim 1 characterized by said upper and said lower non-woven fabrics being of the same material.

* * * * *